(12) United States Patent
Zhong et al.

(10) Patent No.: US 12,439,042 B2
(45) Date of Patent: Oct. 7, 2025

(54) REAL-TIME WIDE-ANGLE VIDEO COMMUNICATION SYSTEM

(71) Applicant: Agora Lab, Inc., Santa Clara, CA (US)

(72) Inventors: Sheng Zhong, Santa Clara, CA (US); Zhonghou Zheng, Shanghai (CN); Zesen Zhuang, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 44 days.

(21) Appl. No.: 17/569,328

(22) Filed: Jan. 5, 2022

(65) Prior Publication Data

US 2023/0217022 A1     Jul. 6, 2023

(51) Int. Cl.
    *H04N 19/44*      (2014.01)
    *H04N 19/119*     (2014.01)
    *H04N 19/184*     (2014.01)
    *H04N 19/593*     (2014.01)

(52) U.S. Cl.
    CPC ......... *H04N 19/119* (2014.11); *H04N 19/184* (2014.11); *H04N 19/44* (2014.11); *H04N 19/593* (2014.11)

(58) Field of Classification Search
    CPC .... H04N 19/119; H04N 19/184; H04N 19/44; H04N 19/593; H04N 19/176; H04N 21/6377; H04N 21/64784; H04N 21/816; H04N 21/8456; H04N 19/167; H04N 21/440245; H04N 21/44012
    See application file for complete search history.

(56) References Cited

U.S. PATENT DOCUMENTS

| | | | |
|---|---|---|---|
| 5,124,840 A * | 6/1992 | Trumbull | G02B 13/08 348/54 |
| 6,675,386 B1 * | 1/2004 | Hendricks | H04N 21/4758 348/E7.071 |
| 6,977,676 B1 * | 12/2005 | Sato | H04N 7/142 348/E7.086 |
| 7,450,165 B2 * | 11/2008 | Ahiska | H04N 23/698 348/240.2 |
| 7,894,531 B1 * | 2/2011 | Cetin | H04N 19/61 375/240.19 |
| 8,427,538 B2 * | 4/2013 | Ahiska | H04N 7/188 348/143 |

(Continued)

FOREIGN PATENT DOCUMENTS

CN      101969541 A  *  2/2011

*Primary Examiner* — Philip P. Dang
(74) *Attorney, Agent, or Firm* — Young Basile Hanlon & MacFarlane, P.C.

(57) ABSTRACT

A method includes maintaining a phase-out list that includes tiles of a current viewport of a wide-angle image that are predicted to no longer be in the viewport after a time duration d from a current time t. Tiles predicted to be viewed at a time that is later than the current time t are obtained. Those of the predicted tiles that are not in a receiver list are added to the receiver list. Tiles that form a current viewing area are rendered using the receiver list. Tiles of the receiver list and a phase-out list are associated with respective display times. Rendering the tiles includes decoding and displaying tiles of the receiver list having display times that are not larger than the current time t and stopping decoding and displaying tiles of the phase-out list associated with the display times that are not larger than the current time t.

16 Claims, 8 Drawing Sheets

(56) References Cited

U.S. PATENT DOCUMENTS

| | | | | |
|---|---|---|---|---|
| 9,478,011 B2 * | 10/2016 | Jacob | ............... | H04N 19/46 |
| 9,602,700 B2 * | 3/2017 | Ahiska | ............... | H04N 23/695 |
| 2006/0062478 A1 * | 3/2006 | Cetin | ............... | H04N 19/107 |
| | | | | 386/E5.001 |
| 2009/0268046 A1 * | 10/2009 | Ogawa | ............... | H04N 19/60 |
| | | | | 348/222.1 |
| 2010/0033552 A1 * | 2/2010 | Ogawa | ............... | H04N 19/17 |
| | | | | 348/420.1 |
| 2011/0063446 A1 * | 3/2011 | McMordie | ............... | G06V 40/166 |
| | | | | 348/E7.086 |
| 2019/0020851 A1 * | 1/2019 | Abe | ............... | H04N 5/772 |
| 2020/0404320 A1 * | 12/2020 | Zhang | ............... | H04N 19/159 |
| 2021/0337228 A1 * | 10/2021 | Wang | ............... | H04N 19/593 |

\* cited by examiner

REAL-TIME WIDE-ANGLE VIDEO COMMUNICATION SYSTEM

TECHNICAL FIELD

This disclosure relates to video coding and transmission, and in particular to a real-time wide-angle video communication system.

BACKGROUND

Some video recording devices can record views in multiple directions simultaneously using, for example, omnidirectional cameras or multiple cameras. Videos recorded in multiple simultaneous directions include 360-degree videos, panoramic videos, immersive videos, or spherical videos (collectively referred to herein as "wide-angle videos"). When playing back such videos, a viewer can control the viewing direction. That is, the viewer can decide which spatial portions of a wide-angle video to view. The spatial portion is then followed (e.g., viewed) in the temporal direction. The part of a wide-angle video that the viewer is currently viewing during playback is referred to as the viewport. The viewport changes as the viewer changes the viewing direction.

SUMMARY

A first aspect is a method that includes maintaining a phase-out list that includes tiles of a current viewport of a wide-angle image that are predicted to no longer be in the viewport after a time duration d from a current time t; obtaining predicted tiles of the wide-angle image that are predicted to be viewed at a time that is later than the current time t; adding to a receiver list those of the predicted tiles that are not in the receiver list; and rendering tiles that form a current viewing area of the wide-angle image using the receiver list. Each tile of the receiver list and a phase-out list can be associated with a respective display time. Rendering the tiles can include decoding and displaying tiles of the receiver list associated with display times that are not larger than the current time t; and stopping decoding and displaying tiles of the phase-out list associated with the display times that are not larger than the current time t.

A second aspect is a device that includes a processor that is configured to receive, from a decoding device, a request for a list of bitstreams, where each bitstream is associated with a respective encoding of a tile of an image of a wide-angle video; transmit, to an encoding device, a request to obtain first bitstreams, where the first bitstreams are not cached at the device; and transmit, to the decoding device, second bitstreams of the list of bitstreams, wherein the second bitstreams are cached at the device.

A third aspect is an encoding device of a wide-angle video that includes a processor configured to receive, from an edge device, an edge list of tiles; responsive to a determination that the edge list includes a first tile and a sender list that is maintained by the encoding device does not include the tile, initiate encoding of the first tile as a new bitstream, and transmit the new bitstream to the edge device; and responsive to a determination that the sender list includes a second tile and the edge list not including the second tile, stop encoding a bitstream corresponding to the second tile. and remove the second tile from the sender list.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
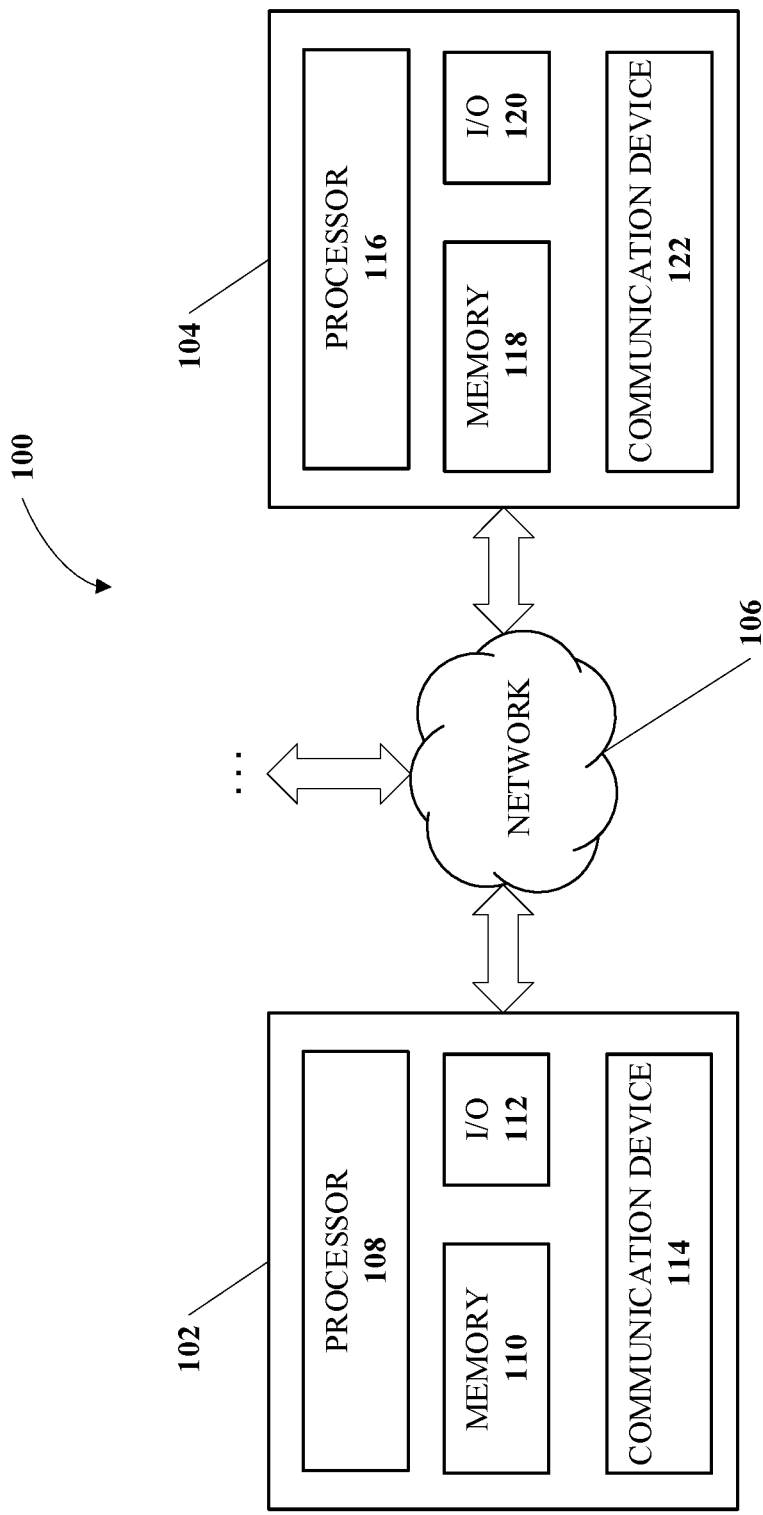
FIG. 1 is a diagram of an example of a system for media transmission.

A wide-angle video communication system may include a sender (i.e., a sending device) and a receiver (i.e., a receiving device). As a person skilled in the art recognizes, the sender may perform at least some of the steps of video capturing, video warping or stitching, video encoding, and video transmission. In an example, the sender can be a client device that is capturing and transmitting (e.g., streaming) a wide-angle video in real-time to one or more receivers. In another example, the sender can be a streaming server, which may receive a real-time wide-angle video or a pre-recoded wide-angle video to be streamed to the one or more receivers. As a person skilled in the art also recognizes, the receiver may perform the steps of video decoding, video de-warping, and rendering. The sender and the receiver may communicate over a network. That is, encoded video data may be transmitted from the sender to the receiver over the network. The video data may be transmitted from the sender to the receiver via multiple servers of the network. One such server is referred to herein as an edge node and is further described below. Multiple receivers may be connected to the same edge node.

A wide-angle video is composed of temporally arranged images. An image of the wide-angle video can be the output of the stitching operation of all of the constituent pictures, which may also be referred to as faces or facets, obtained by, for example, the multiple cameras of a wide-angle capture device. To illustrate, a wide-angle video may be captured using a 6-camera device where the cameras are arranged in a cube shape and having, collectively, a field of view (FOV) up to and including a 3600 FOV. Each of the cameras may have an FOV (e.g., 120°) in a longitudinal dimension and another FOV (e.g., 90°) in a latitudinal dimension. As such, the FOV of any one of the cameras may overlap the FOVs of some of the other cameras. The overlap areas can be used in the stitching operation.

Different techniques are known for encoding and decoding wide-angle videos. For example, wide-angle videos can be encoded/decoded using techniques described in or similar to the scalable video coding extension to HEVC (SHVC) of the Joint Collaborative Team on Video Coding (JCT-VC) of ITU-T SG16 WP3 and ISO/IEC JTC1/SC29/WG11. However, other techniques are possible. Encoding images of the wide-angle video can include partitioning the images into titles. Each tile (i.e., a sequence in time of the tile) may be encoded as a separate compressed bitstream (referred to herein as a "compressed tile stream" or simply a "tile stream." To illustrate, and without limitations, each of the images of the wide-angle video may be an 8K image (i.e., 7,680×4,320 pixels) that is partitioned into 720p tiles (i.e., 1280×720 pixels per tile). Using the nomenclature of a H.264, as a non-limiting example, the sequence of tiles may grouped where each group is encoded/decoded according to a coding structure, such as IBBPBB, where I means an intra-predicted tile, P means that the tile is predicted using a previous in-time tile, and B means that the tile is predicted using both a previous and forward tile.

As already mentioned, a viewer can watch only a portion of a wide-angle video at any one time. That is, the viewer may be able to watch only part of the whole imaged scene at any one time. The area that the viewer can or is interested in viewing is a "viewport." The viewport can be said to be encompassed by, or included in, a region of interest (ROI). As such, an ROI, as used herein, refers to the titles of an image of a wide-angle video within which the viewport is included.

The viewer may change the viewport at any point in time. To illustrate, and without limitations, the viewer may be watching, using a receiving device (e.g., a handheld device, a head mounted device, or any other device that is capable of rendering a wide-angle vide), the video stream of a runner that is traversing the scene from left to right. Thus, the viewer may move the viewport to the right as the runner moves to the right. In another example, while the viewer is following the runner, the viewer hears the sounds of low-flying airplanes and causes the receiving device to change the viewing angle by pointing the device upwards so that the viewer can see the airplanes. Typically, the wide-angle video communication system may include a viewpoint prediction function that anticipates which tiles the receiving device will require in the near future (e.g., in 1, 2, 3 seconds or some future time).

In conventional wide-angle video communication systems, the sender may encode and transmit, and the receiver may receive and decode all tiles of all images at the original capture quality even though the viewer is not capable of viewing all such data at any one time. Transmitting (e.g., broadcasting) and receiving the whole of a wide-angle video at the high quality consumes a significant amount of bandwidth. However, such bandwidth consumption is unnecessary, and is therefore wasteful, since, as already mentioned, a viewer cannot view the whole of a wide-angle video. Additionally, encoding whole frames of a wide-angle video may consume unnecessary compute resources at the encoder (i.e., the sender) therewith degrading the performance of the sender, especially in real-time applications. Similarly, decoding whole frames of a wide-angle video may consume unnecessary compute resources at the receiver (i.e., the decoder) therewith degrading the viewing (e.g., display) performance at the receiver.

Some other conventional wide-angle video communication systems may use layered encoding/decoding where the wide-angle video may be encoded into a base layer and one or more enhancement layers. The base layer can be used to encode, at a lower quality, the whole (i.e., all the images) of the wide-angle video. The base layer can include or be a down-sampled version of the wide-angle video. The enhancement layer can include encoded data of the original wide-angle video at the original resolution of the wide-angle video. The receiver (e.g., a decoder of the receiving device) can always decode the base layer data and then decode, using the enhancement layer data, data (i.e., encoded data of tiles) corresponding to a current viewport. Such techniques can also waste network and computational resources as some portions of the wide-angle video may be never be viewed.

Some other conventional wide-angle video communication systems may use viewport prediction to encode, at a higher quality, those tile streams predicted to be viewed at the receiver. For example, the receiver may transmit to the sender a list of the predicted tiles and the sender encodes and transmits those tiles before they are to be viewed by the receiver. However, at least due to network latencies, at least some tiles associated with the predicted tiles may not arrive at the receiver prior to the display times of these tile streams. Additionally, and as further described below, such techniques may result in re-encoding (by the sender) and re-transmission (by the sender and/or network service nodes) of already encoded and transmitted tile streams, which is also wasteful.

Implementations according to this disclosure can reduce network bandwidth consumption of a network and the processing power consumption of the receiving and sending devices in addition to improving the viewing experience at the receiver. Viewport prediction may be performed at the receiver to identify tiles of the wide-angle video that the viewer is likely to watch in the near future. The receiver may transmit an indication of such tiles to the sender via, for example, an edge node (i.e., a network server that is further described below) that caches encoded tile bitstreams received from the sender. That is, the receiver transmits a request for tile bitstreams to the edge node. The edge node can transmit to the receiver those of the tile bitstreams that are already cached in the edge node, and the edge node transmits a request for the non-cached tile bitstreams to sender. As such, the sender does not perform re-encoding and re-transmission of previously encoded and previously transmitted tile bitstreams; and the receiver receives requested compressed tile bitstreams before their display time and can decode them before their display time. Additionally, the sender may be currently encoding one or more tile bitstreams. If a received request for tile bitstreams does not include one of the currently being encoded tile bitstreams, then the sender can start encoding them. Accordingly, using the teachings of this disclosure provides an efficient way of utilizing the prediction to give good user viewing experiences.

To describe some implementations in greater detail, reference is first made to examples of hardware and software structures used to implement a real-time wide-angle video communication system.

FIG. 1 is a diagram of an example of a system 100 for media transmission, including the transmission of real-time wide-angle video. As shown in FIG. 1, the system 100 can include multiple apparatuses and networks, such as an apparatus 102, an apparatus 104, and a network 106. The apparatuses can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, for example, a web host or a cloud service provider. In some implementations, an apparatus can be implemented in the form of multiple groups of computers that are at different geographic locations and can communicate with one another, such as by way of a network. While certain operations can be shared by multiple computers, in some implementations, different computers are assigned to different operations. In some implementations, the system 100 can be implemented using general-purpose computers/processors with a computer program that, when executed, carries out any of the respective techniques, algorithms, and/or instructions described herein. In addition, or alternatively, for example, special-purpose computers/processors including specialized hardware can be utilized for carrying out any of the methods, algorithms, or instructions described herein.

The apparatus 102 can have an internal configuration of hardware including a processor 108 and a memory 110. The processor 108 can be any type of device or devices capable of manipulating or processing information. In some implementations, the processor 108 can include a central processor (e.g., a central processing unit or CPU). In some implementations, the processor 108 can include a graphics processor (e.g., a graphics processing unit or GPU). Although the examples herein can be practiced with a single processor as shown, advantages in speed and efficiency can be achieved using more than one processor. For example, the processor 108 can be distributed across multiple machines or devices (each machine or device having one or more processors) that can be coupled directly or connected via a network (e.g., a local area network).

The memory 110 can include any transitory or non-transitory device or devices capable of storing codes (e.g., instructions) and data that can be accessed by the processor (e.g., via a bus). The memory 110 can be a random-access memory (RAM) device, a read-only memory (ROM) device, an optical/magnetic disc, a hard drive, a solid-state drive, a flash drive, a security digital (SD) card, a memory stick, a compact flash (CF) card, or any combination of any suitable type of storage device. In some implementations, the memory 110 can be distributed across multiple machines or devices, such as in the case of a network-based memory or cloud-based memory. The memory 110 can include data (not shown), an operating system (not shown), and one or more applications (not shown). The data can include any data for processing (e.g., an audio stream, a wide-angle video stream, or a multimedia stream). At least one of the applications can include programs that permit the processor 108 to implement instructions to generate control signals for performing functions of the techniques in the following description. For example, when functioning as a sender, the applications can include instructions for performing at least the technique described with respect to FIG. 7; and when functioning as a receiver, the applications can include instructions for performing at least the technique described with respect to FIG. 5.

In some implementations, in addition to the processor 108 and the memory 110, the apparatus 102 can also include a secondary (e.g., external) storage device (not shown). The secondary storage device can be a storage device in the form of any suitable non-transitory computer-readable medium, such as a memory card, a hard disk drive, a solid-state drive, a flash drive, or an optical drive. Further, the secondary storage device can be a component of the apparatus 102 or can be a shared device accessible via a network. In some implementations, the application in the memory 110 can be stored in whole or in part in the secondary storage device and loaded into the memory 110 as needed for processing.

The apparatus 102 can include input/output (I/O) devices. For example, the apparatus 102 can include an I/O device 112. The I/O device 112 can be implemented in various ways, for example, it can be a display that can be coupled to the apparatus 102 and configured to display a rendering of graphics data. The I/O device 112 can be any device capable of transmitting a visual, acoustic, or tactile signal to a user, such as a display, a touch-sensitive device (e.g., a touch-screen), a speaker, an earphone, a light-emitting diode (LED) indicator, or a vibration motor. The I/O device 112 can also be any type of input device either requiring or not requiring user intervention, such as a keyboard, a numerical keypad, a mouse, a trackball, a microphone, a touch-sensitive device (e.g., a touchscreen), a sensor, or a gesture-sensitive input device.

The I/O device 112 can alternatively or additionally be formed of a communication device for transmitting signals and/or data. For example, the I/O device 112 can include a wired means for transmitting signals or data from the apparatus 102 to another device. For another example, the I/O device 112 can include a wireless transmitter or receiver using a protocol compatible to transmit signals from the apparatus 102 to another device or to receive signals from another device to the apparatus 102.

The apparatus 102 can include a communication device 114 to communicate with another device. The communication can be via a network 106. The network 106 can be one or more communications networks of any suitable type in any combination, including, but not limited to, networks using Bluetooth communications, infrared communications, near field connections (NFCs), wireless networks, wired networks, local area networks (LANs), wide area networks (WANs), virtual private networks (VPNs), cellular data networks, or the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the apparatus 102 to provide functions of communication with the network 106.

Similar to the apparatus 102, the apparatus 104 includes a processor 116, a memory 118, an I/O device 120, and a communication device 122. The implementations of elements 116-122 of the apparatus 104 can be similar to the corresponding elements 108-114 of the apparatus 102.

Each of the apparatus 102 and the apparatus 104 may be, such as at different times of a real-time communication session, a receiving device (i.e., a receiver) or a sending device (i.e., a sender). A receiver can perform decoding operations, such as of wide-angle video streams. As such, the receiver may also be referred to as a decoding apparatus or device and may include or be a decoder. A sender may also be referred to as an as an encoding apparatus or device and may include or be an encoder. The apparatus 102 can communicate with the apparatus 104 via the network 106.

Figure 2A:
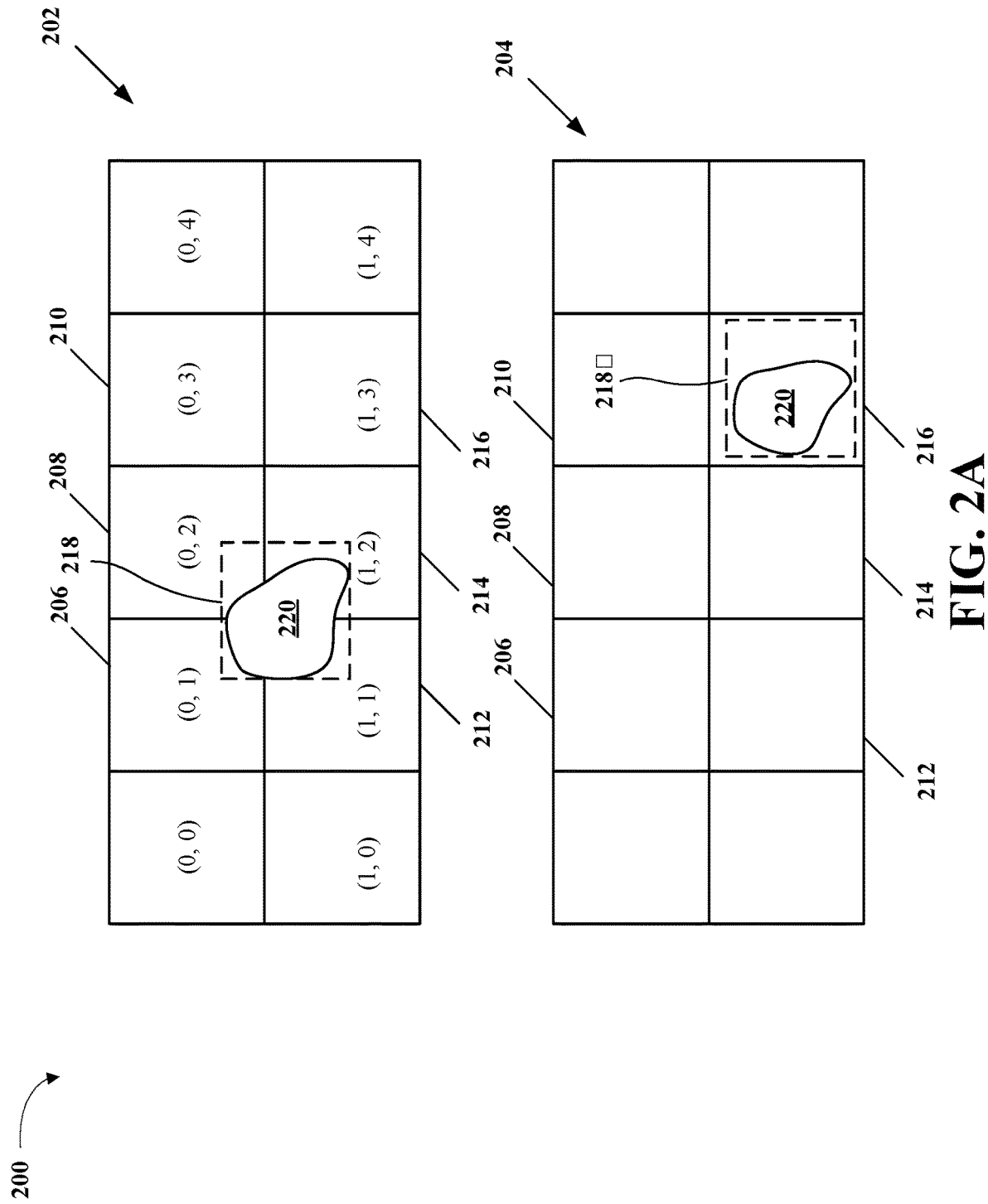
FIG. 2A is a diagram of an example of tiles of images of a wide-angle video stream.

FIG. 2A is a diagram of an example 200 of tiles of images of a wide-angle video stream (i.e., a video stream 200). The video stream 200 can be a video source stream for encoding or a video stream decoded from a video bitstream. The example 200 illustrates two images (i.e., an image 202 and an image 204) of the video stream 200. However, as can be appreciated, the video stream 200 can include many more than two images. The images 202 and 204 are partitioned into tiles. Each tile corresponds to a spatial location within the image and can be identified based on that location. The example 200 illustrates that each of the images 202, 204 is partitioned into ten tiles, including tiles 206-216, arranged in a 2×5 grid. However, the disclosure is not so limited and an image can be partitioned into more or fewer tiles, rows, and/or columns.

In an example, a tile can be identified using Cartesian coordinates. For example, the tile 206 can be identified as the tile at the location (0, 1), the tile 216 can be identified as the tile at the location (1, 3), and so on. In another example, the tiles can be identified according to their positions in a scan order of the image. That is, the tiles may be numbered, for example, from 0 to the maximum number of tiles in the image minus 1. As such, the tiles of the image 202 may be numbered from 0 to 9 where the tiles 206-216 are identified as the tiles numbered 1, 2, 3, 6, 7, and 8, respectively.

The image 204 may be later-in-time from the image 202 in the video stream 200. The example 200 illustrates a viewport 218 that includes an object 220 that a viewer (not shown) may be tracking. The viewport 218 that is encompassed by the tiles 206, 208, 212, and 214. The image 204 illustrates that the object 220 has moved and that the new viewport is now a viewport 218', The viewport 218' is encompassed only by the tile 216.

The wide-angle video stream may be encoded using scalable video coding techniques. Scalable video coding may refer to a coding structure where bitstreams can contain multiple representations of the content, for example, at different bitrates, resolutions or frame rates. The receiver can extract a desired representation by decoding only certain parts of a scalable bit streams. A scalable bitstream typically consists of a "base layer" providing the lowest quality video available and at least one enhancement layer that enhances the temporal resolution and/or the spatial resolution when received and decoded together with lower layers. Motion and mode information of the enhancement layer can be predicted from lower layers (e.g., the base layer). Similarly, the pixel data of the lower layers can be used to create prediction for data of the enhancement layer(s).

As such, for example, each image (e.g., the images 202, 204) can be encoded in a base layer. Images may first be down sampled and the down-sampled image may be encoded in the base layer. At last, some tiles of an image may be encoded in an enhancement layer. In an example, the coding structure may include an intermediate layer for up-sampling at least a portion of the down-sampled image. Data of the intermediate layer can be used to code tiles in the enhancement layer. As such, in an example, an image may be down-sampled and encoded in the base layer; a portion of the image that is required for coding a tile may be up-sampled in the intermediate layer; and the data of the intermediate layer can be used for coding the tile.

Figure 2B:
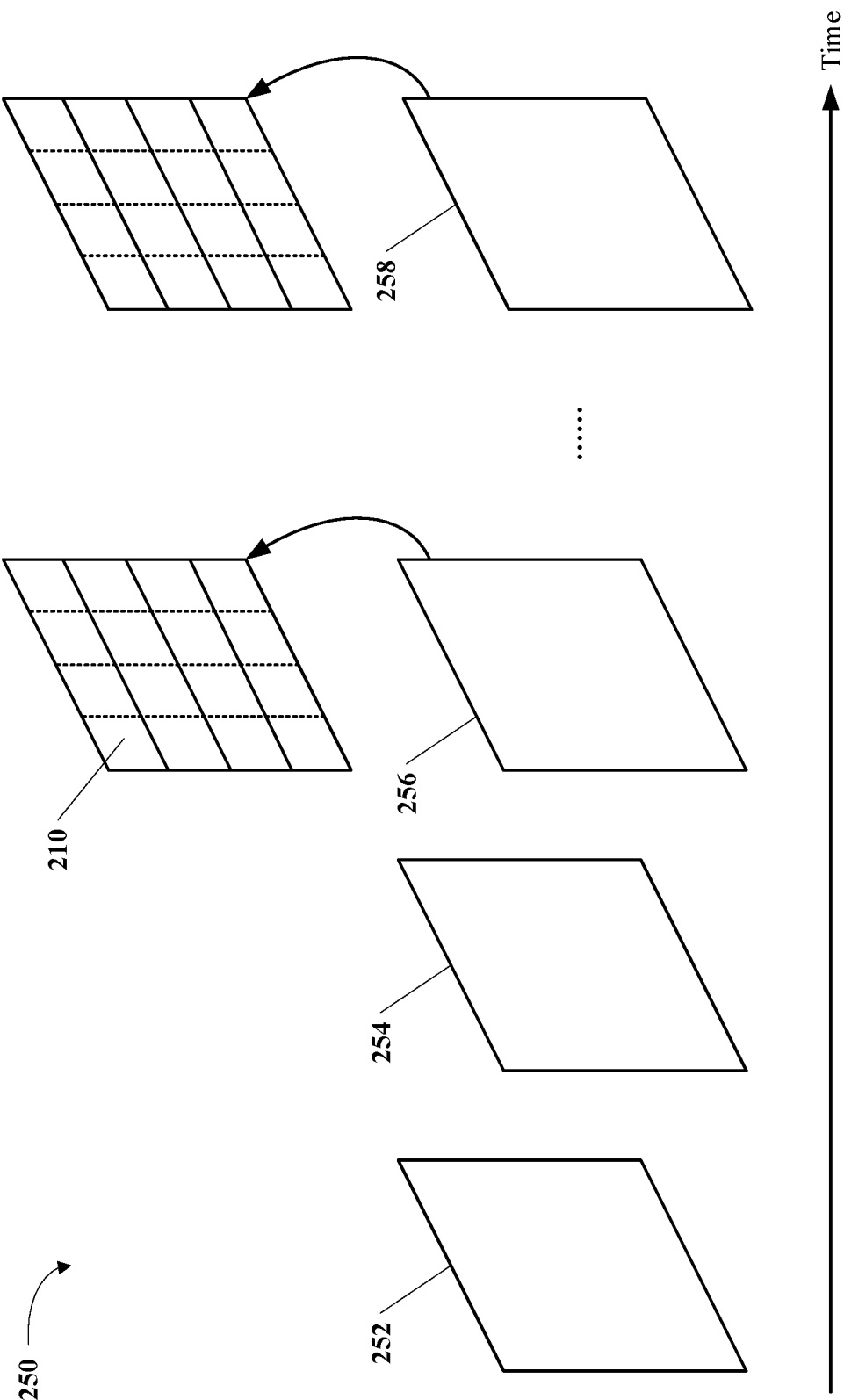
FIG. 2B illustrates encoding tiles of an image of a wide-angle video stream.

FIG. 2B illustrates encoding tiles of an image of a wide-angle video stream. A timeline is shown in FIG. 2B, the arrow of which indicates the direction of time. While not specifically shown, the tiles of FIG. 2B are assumed, as described above, to be encoded in an enhancement layer. As such, at least some tiles (i.e., tile streams) of the wide-angle video stream may be encoded in respective bitstreams in the enhancement layer. When a tile is encoded in an enhancement layer, the encoding may reference the tile data only or the tile may be encoded by referencing both the tile data and the corresponding co-located area decoded from the base layer.

A tile stream 250 can include a series of tiles along the timeline, including tiles 252-258. The tile stream 250 may be, for example, a stream over time of the tile 216 of FIG. 2A. As such, the tile 256 can be, for example, the tile 214 of the image 202 and the tile 258 can be the tile 214 of the image 204. A tile (e.g., the tile 256) that is encoded in the enhancement layer may be a tile that encompasses at least a portion of a viewport. If the tile 256 is being encoded or decoded using inter-prediction, for example, its reference tile(s) can be one or more earlier-in-time tiles (such as one or more of the tiles 252, 254, 256), one or more later-in-time tiles (such as the tile 258), one or more tiles of a lower layer (e.g., the base layer) one or more or a combination thereof.

Each tile of the tile stream 250 can be divided into multiple processing units. In some video coding standards, the processing units can be referred to as "macroblocks" or "coding tree blocks" (CTBs). In some implementations, each processing unit can be further divided into one or more processing sub-units, in which the processing sub-units are referred to as "prediction blocks" or "coding units" (CUs) depending on the standards. The size and shape of the processing units and sub-units can be arbitrary, such as 8×8, 8×16, 16×16, 32×32, 64×64, or any size in any shape suitable for encoding a region of the picture. Typically, the more details the region includes, the smaller the size of the processing units and sub-units can be. For ease of explanation without causing ambiguity, the processing units and sub-units are uniformly referred to as "blocks" hereinafter unless explicitly described otherwise. For example, in FIG. 2B, the tile 256 is shown to have 4×4 blocks, including a block 260. The boundaries of the blocks are shown as dotted lines.

Figure 3:
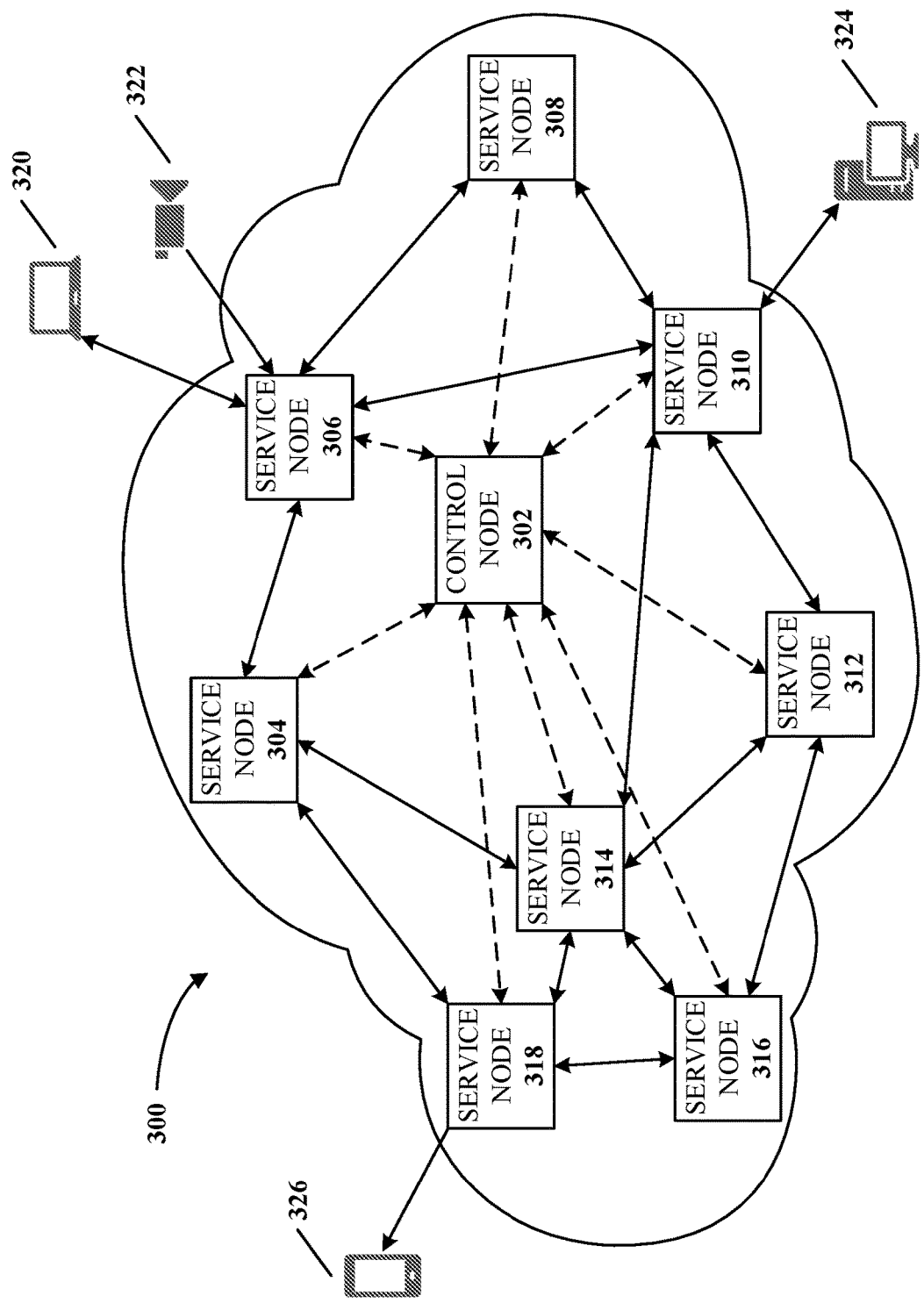
FIG. 3 is a diagram of a network for real-time video communications.

FIG. 3 is a diagram of a network 300 for real-time video, including wide-angle videos, communications. The network 300 can be implemented on an application layer of a computing network (e.g., the network 106 of FIG. 1). For example, in a TCP/IP model, a computer-communications network can be partitioned into multiple layers. For example, in a hierarchical order from bottom to top, the multiple layers can include a physical layer, a network layer, a transport layer, and an application layer. Each of the foregoing layers serves the layer above it and is served by the layer below it. The application layer is the TCP/IP layer that directly interacts with an end user with software applications. The network 300 can be implemented as application-layer software modules in the network 106 of FIG. 1.

In some implementations, the network 300 can be implemented as software installed on nodes (e.g., servers) of the network 106. In some implementations, the network 300 requires no dedicated or specialized hardware (e.g., a dedicated or proprietary network access point hardware) on the nodes where it is implemented. For example, a node can be any x86 or x64 computer with a Linux® operating system (OS), and a network interface of the node functioning as an access point of the network 300 can be any general-purpose network interface hardware (e.g., an RJ-45 Ethernet adapter, a wired or wireless router, a Wi-Fi communications adapter, or any generic network interface hardware).

In addition, the network 106 of FIG. 1 where the network 300 is constituted can be a public network (e.g., the Internet). In some implementations, the nodes of the network 300 can be capable of communicating over the network 300 or the public network. In other words, the data traffic of the network 300 can be partially routed through the public network, not entirely within the network 300. In some implementations, all the nodes in the network 300 can be capable of simultaneously communicating over the network 300 and over the public network for the data traffic.

In FIG. 3, the network 300 includes two types of nodes: service nodes and control nodes. The service nodes (e.g., service nodes 304-318) are used for receiving, caching, forwarding, and delivering multimedia data from and to different user terminals. The service nodes can also receive and transmit feedback messages, such as those further described below. The control nodes (e.g., a control node 302) may be used for controlling the network traffic. Though not fully shown in FIG. 3, the service nodes and the control nodes can be interconnected with each other. That is, any two nodes in the network 300 can be directly connected. The connections between the nodes can be bidirectional or unidirectional. The connections between the nodes can be sometimes bidirectional and sometimes unidirectional. As can be appreciated, there may not be a direct connection between two nodes. As such, the nodes can indirectly communicate through a third node.

The connections between the nodes of the network 300 are shown as lines between service nodes and control nodes in FIG. 3. The solid lines with double arrows can represent bidirectional interconnections between service nodes. The dashed lines with double arrows can represent bidirectional connections between service nodes and control nodes. A control node can receive data for transmission capacity determination from the service nodes and can send optimal paths to the service nodes. The transmission capability of a node refers to existing or potential capability or ability of the node to forwarding (e.g., receiving and resending) network data. The transmission capability between a first node and a second node refers to at least one of: existing or potential capability or ability of the first node to transmitting network data from the first node to the second node, and existing or potential capability or ability of the second node to transmitting network data from the second node to the first node. It should be noted that the network 300 can be implemented as having any number of any type of nodes with any configurations of interconnections, not limited to the example as shown in FIG. 3.

The service nodes can be further divided into two types: edge service nodes (or "edge nodes" or "edge devices" for simplicity) and router service nodes (or "router nodes" for simplicity). An edge node is directly connected to an end-user terminal (or "terminal" for simplicity), such as terminals 320-326. The terminals can include any end-user device capable of multimedia communications, such as a smartphone, a tablet computer, a camera, a display, a laptop computer, a desktop computer, a workstation computer, or an apparatus with a multimedia I/O device. In FIG. 3, the service node 306 is an edge node of the terminals 320 and 322. The service node 310 is an edge node of the terminal 324. The service node 318 is an edge node of the terminal 326. The connections between the terminals 320-326 and their respective edge nodes are shown as single-arrow or double-arrow solid lines. The arrows represent the directions of the multimedia data. For example, for the terminal 320 and 324, the double-arrow solid lines represent that they have bidirectional communications with the service nodes 306 and 310, respectively. For the terminal 322, the single-arrow solid line represents that it is sending data to the service node 306. For the terminal 326, the single-arrow solid line represents that it is receiving data from the service node 318.

A router node is not directly connected to any terminal. A router node (such as the service nodes 304, 308, and 312-316) participates in forwarding data. In some implementations, a service node can switch between roles of an edge node and a router node at different time, or function as both at the same time. For example, the service node 306 is the edge node of the terminal 320 for a first transmission path from the terminal 322 to the terminal 324 via the service node 306 and the service node 310. The service node 306 is a router node for a second transmission path from the terminal 324 to the terminal 326 via the service node 310, the service node 306, the service node 304, and the service node 318. When the first and second transmission paths are simultaneously active, the service node 306 can function as both an edge node and a router node.

In some implementations, the edge nodes of the network 300 can be connected to an autonomous system (AS) operated by an Internet service provider (ISP). The topology of the network 300 can be divided into hierarchical groups based on geographic locations of the service nodes, AS's, and ISP's. The data transmission of the network 300 can be categorized into two types: inter-node transmission (i.e., network traffic between service nodes) and terminal-node transmission (i.e., network traffic between edge nodes and terminals). Various strategies can be implemented to optimize the inter-node and terminal-node transmission, which is disclosed in the U.S. patent application Ser. No. 15/052,810, filed on Feb. 24, 2016, the content of which is herein incorporated by reference in its entirety.

Figure 4:
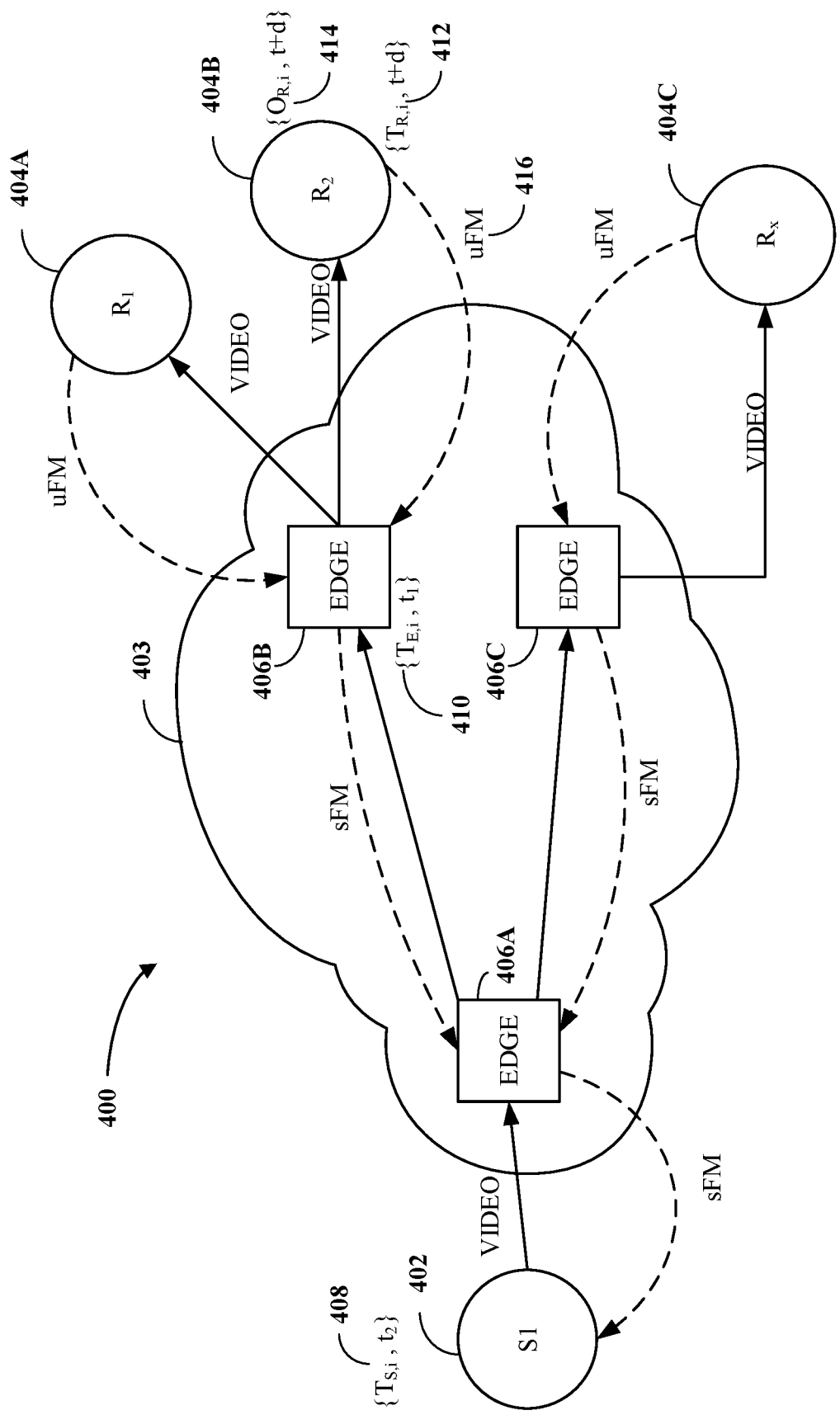
FIG. 4 is a diagram of a system for real-time wide-angle video communication system.

FIG. 4 is a diagram of a system 400 for real-time wide-angle video communication system. The system 400 includes a simplified view of the network 300 of FIG. 3. The system 400 includes a sender 402, a network 403, and one or more receivers 404A-404C. The sender 402 can transmit (e.g., stream) compressed wide-angle video data (e.g., streams) over the network 403 to the receivers 404A-404C. As such, the sender 402 can include an encoder for encoding wide-angle videos for transmission to the receivers; and the receivers can include respective decoders for decoding received compressed bitstreams of the wide-angle videos. Without loss of generality, FIG. 4 illustrates a scenario where the users of receivers 404A-404C may be viewing, and the receivers 404A-404C may be displaying, the video streams transmitted by the sender 402.

As described with respect to FIG. 3, the compressed bitstreams transmitted by the sender can pass through a number of service nodes of the network 403, including edge nodes 406A-406C. The sender 402 connects to the network 403 via the edge node 406A, the receivers 404A-404B connect to the network 403 via the edge node 406B, and the receiver 404C connects to the network 403 via the edge node 406C. As can be appreciated, the system 400 can include more senders, more or fewer receivers, and/or more or fewer service nodes.

At each time step (e.g., during a time interval), a sender may be capturing, encoding, and/or transmitting compressed bitstreams to one or more receivers; a service node can be receiving and caching compressed bitstreams, transmitting at least some of the cached compressed bitstreams to one or more other service nodes or receivers; and a receiver can be receiving some compressed bitstreams, decoding the received compressed bitstreams, rendering at least some of the decoded compressed bitstreams, and performing viewport prediction. The compressed bitstreams include compressed data of a wide-angle videos (e.g., images and or tiles thereof). A receiver may perform viewport prediction in any number of ways that are known in the art. For example, the receiver may perform viewport prediction using motion data, such as motion data of objects in detected in wide-angle videos, such as objects in a current viewport, motion data of the viewing device, or a combination thereof. Each component (e.g., a receiver, a sender, or a service node) operates, at each time step, independently and asynchronously from every other component of the system 400.

The sender maintains a list of tiles (i.e., a sender list 408), $\{T_{S,t'}, t_2\}$, of the wide-angle video that currently being encoded and transmitted over the network 303 to the receivers. That a tile is being encoded, and as described above, means that a tile stream corresponding to the tile is being encoded. Thus, the sender list $\{T_{S,i}, t_2\}$ can also be considered or referred to as a "current encoding list." At any time, step $t_2$, the sender updates the sender list 408 based on feedback messages that the sender receives. In the list $\{T_{S,i}, t_2\}$, the subscript S stands for "sender," the subscript i stands for or represents a tile stream of the wide-angle video. As such, $T_{S,i}$ can be or can indicate, for example, the tile 206 of the image 202 of FIG. 2.

A service node (e.g., an edge node connected to a receiver) maintains a list of tiles (i.e., an edge list 410), $\{T_{E,i}, t_1\}$, of the wide-angle video for which the service node is receiving and storing (e.g., caching), or expects to receive and store, respective compressed bitstreams. At any time, step $t_1$, the service node updates the edge list 410 based on received compressed tile streams and feedback messages received from receivers. The edge list can be or can be thought as indicating the compressed tile bitstreams cached at the service node—the bitstreams that are used or are going to be used by the receiver. Thus, the edge list $\{T_{E,i}, t_1\}$ can also be considered or referred to as a "cached bitstream list." The service node may receive compressed bitstreams from upstream devices such as another service node or the sender 402, and may downstream compressed bitstreams to downstream service nodes or to receiving devices connected directly to the service node. In the list $\{T_{E,i}, t_1\}$, the subscript i stands for or represents a tile stream of the wide-angle video, and the subscript E stands for edge node. However, the subscript E should be understood to encompass any service node.

A receiver maintains a list of tiles (i.e., a receiver list 412), $\{T_{R,i}, t+d\}$, that includes the tiles output by the viewport prediction of the receiver. At any time, step t, the receiver updates the receiver list 412. The receiver list $\{T_{R,i}, t+d\}$ includes the tiles that are predicted to be viewed some time (t+d) after the current time t. Thus, the receiver list $\{T_{R,i}, t+d\}$ can also be considered or referred to as a "prediction list." In the list $\{T_{R,i}, t+d\}$, the subscript i stands for or represents tile stream of wide-angle video, and the subscript R stands for "receiver." To illustrate, at a time step t, the receiver list $\{T_{R,i}, t+d\}$ may include indications of the tiles 206, 208, 212, 214, and 216 of the image 202 of FIG. 2. The tile 216 is included because it is predicted to be viewed at time t+d.

The receiver also maintains a list of tiles (i.e., a phase-out list 414), $\{O_{R,i}, t+d\}$, that includes the tiles currently displayed (i.e., are in the current viewport) at the receiver at time t and will be out of the viewport at time t+d. To illustrate, at a time $t^0$, the viewport includes tiles 206, 208, 212 and 214 of FIG. 2A. At a time $t^1$ (where $t^1=t^0+d$) the viewport moves to the tile 216 of FIG. 2A. The phase-out list 414 at time $t^0$ may include the tiles 206, 208, 212, and 214 of FIG. 2A because they are predicted to no longer be in the viewport at time $t^1$.

The time duration d is preferably longer than the round trip time (RTT) between the receiver and the sender so as to allow enough time to notify the sender of the receiver list $\{T_{R,i}, t+d\}$ (or a portion thereof, as further described below) and for the sender to 1) encode those tiles predicted to be viewed in the future (i.e., at the time t+d) and 2) transmit those compressed tiles to the receiver before the time of display of such tiles has passed at the receiver. If the compressed bitstream corresponding to the tiles requested by the receiver are not received before the time t+d, then the viewing experience may be degraded at the receiver. For example, the receiver may display base layer data (which is of lower quality) or may wait (e.g., pause) until the enhancement layer data arrive and are decoded. In some examples, the time duration d may be 3 seconds or less. However, other time durations are possible. For example, in real-time communications, the time duration d may be less than 1 second. Again, other values are possible. As can be appreciated, larger values of d may also degrade the performance of the viewport prediction: the longer the time duration is, the less accurate the viewport prediction may be.

It is noted that the time steps t, $t_1$, and $t_2$ of FIG. 4 are not related. No meaning should be inferred from the subscripts used. Again, the sender, receiver(s), and service node(s) operate asynchronously. That is, each of the sender, receiver(s), and service node(s) separately determine a suitable time to perform its respective functions (e.g., encoding, decoding, and transmission, respectively). Additionally, each of the tile's $T_{R,i}$, $T_{E,i}$, and $T_{S,i}$ can be associated with a respective time tag that indicates the display time of the tile.

A receiver transmits an edge list (such as the edge list 410) to an edge node using a user feedback message (uFM), such as a uFM 416. A service node (e.g., an edge node) transmits an edge list (such as the edge list 410) to another service node or to the sender using a server feedback message (sFM). For example, each of the uFM and the sFM may have a specified format, including a header and a payload, such that at least a portion of the payload may be the appropriate tile list, with each item having a time tag. The service node updates the edge list to reflect what of the receiver list the service node is going to actually request from the sender. Said another way, the service node may aggregate the information from multiple receivers (i.e., multiple received edge lists) into a server feedback message sFM.

Figure 5:
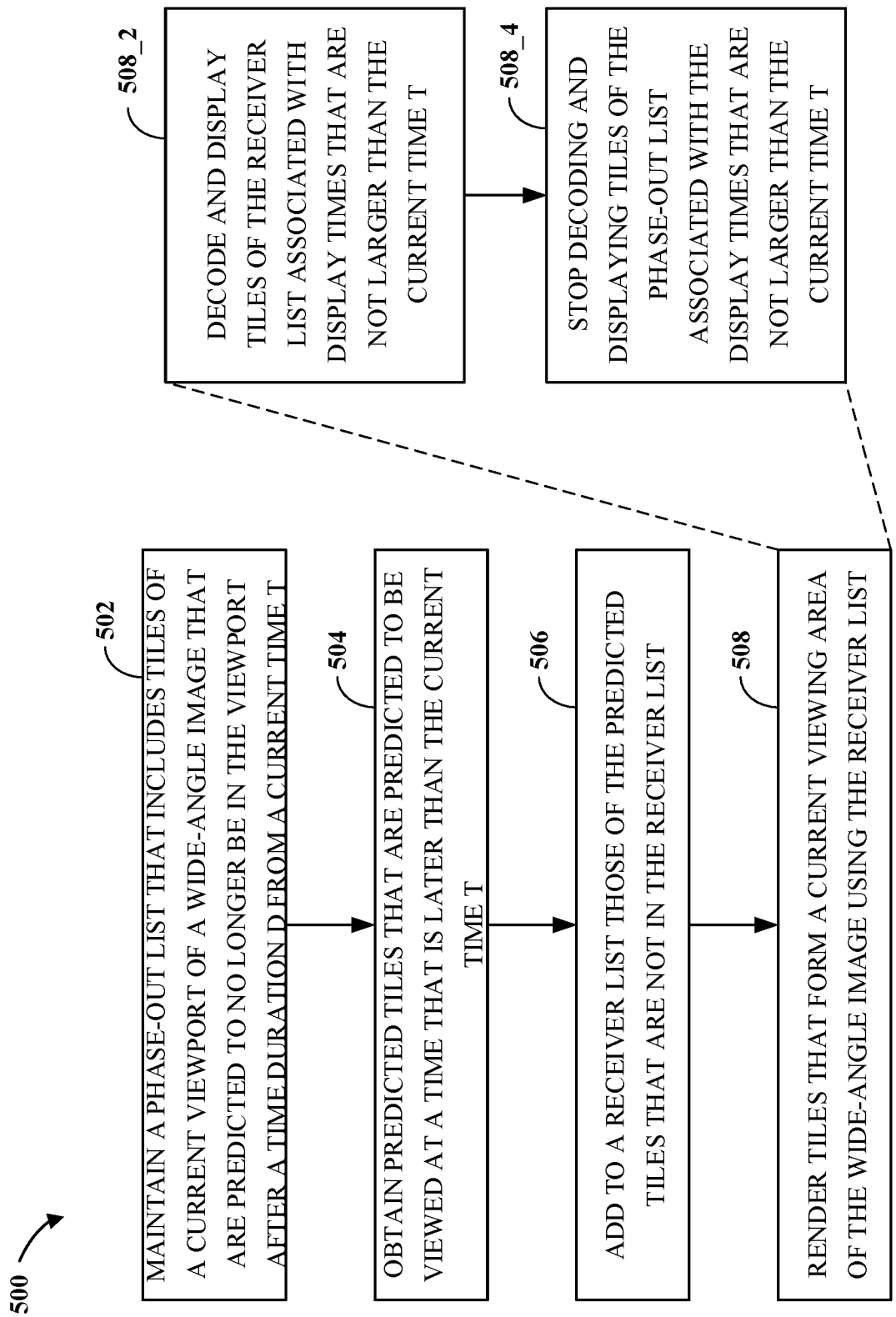
FIG. 5 is a flowchart of an example of a technique 500 of a receiver for efficient real-time wide-angle video communication.

FIG. 5 is a flowchart of an example of a technique 500 of a receiver for efficient real-time wide-angle video communication. The technique 500 can be implemented by a receiver, such as one of receivers 404 of FIG. 4 or the apparatus 104 of FIG. 1. The technique 500 can be implemented as software modules stored in the memory 118 of FIG. 1 as instructions and/or data executable by the processor 116 of FIG. 1. For another example, the technique 500 can be implemented in hardware as a specialized chip storing instructions executable by the specialized chip. The technique 500 can be performed by the receiver at each time step. To illustrate, if the receiver is displaying images of the wide-angle video at a rate of 30 frames per second, then the technique 500 may be performed once approximately every 33 milliseconds.

As described with respect to FIG. 4, the receiver can maintain a receiver list $\{T_{R,i}, t+d\}$ of tiles of a wide-angle video that are predicted to be viewed at a time later than the tile prediction time. The receiver list $\{T_{R,i}, t+d\}$ is a running list of predicted tiles. That is, for example, the receiver list $\{T_{R,i}, t+d\}$ may include tiles $T_{R,i}$ that, at a time $t^0<t$, were precited to be viewed at a time $t^0+d$; and at a time $t^1>t$, the receiver list $\{T_{R,i}, t+d\}$ may be updated to include tiles that are predicted at the time $t^1$ to be viewed at the time $t^1+d$. As such, the variable t in receiver list $\{T_{R,i}, t+d\}$ merely indicates "a current time" that the receiver list is updated.

As described above with respect to FIG. 4, the receiver can also maintain a phase-out list $\{O_{R,i}, t+d\}$. At 502, the receiver maintains a phase-out list $\{O_{R,i}, t+d\}$ that includes currently displayed tiles (i.e., tiles of a current viewport) of the wide-angle image but are predicted to no longer be in the viewport at the time t+d. That is, the receiver uses the phase-out list to add tiles that may be currently being displayed at a display of the receiver but are predicted to no longer be in the viewport at the time t+d. At 504, predicted tiles of the wide-angle image are obtained. The predicted tiles are those tiles that a prediction function of the receiver predicts will be viewed at a time that is later than a current time t. The prediction function may be implemented in any number of ways known in the art.

At 506, those of the predicted tiles that are not in the receiver list are added to the receiver list. The receiver list $\{T_{R,i}, t+d\}$ can be as described with respect to the receiver list 412 of FIG. 4. Any $T_{R,i}$ of the predicted tiles that is not in the receiver list $\{T_{R,i}, t+d\}$ is added to the receiver list $\{T_{R,i}, t+d\}$. That is, future tiles are added to the current receiver list so that associated compressed tile bitstreams associated with at least some of these tiles can be requested, received, and decoded as early as possible for at least the reasons described below.

At the current time step t, and as described above, the receiver can receive compressed bitstreams corresponding to (e.g., associated with) at least some of the tiles of the receiver list. Each of such compressed bitstreams can be such that the first picture of the tile stream encompassed in the compressed bitstream is encoded using intra-prediction. At least some of other pictures of the tile stream may also be encoded using intra-prediction. The receiver can decode but does not display (i.e., cause to be displayed) at least some of the compressed bitstreams. A decoded picture of a tile bitstream may or may not be displayed. A decoded picture is displayed when the decoded picture is in the viewport at the display time. Some pictures may never be displayed. However, such pictures may still be needed (e.g., received and decoded) because they may be used as reference pictures for decoding other pictures that will be displayed. It is also noted that a decoded picture that is to be displayed may not be displayed immediately after being decoded—such decoded picture is displayed when its display time arrives and may be temporarily buffered until its display time arrives. That is, the receiver decodes without displaying those compressed tile bitstreams associated with the tiles of the receiver list having display times that are larger than the current time t. This is so because it is desirable to receive as many future tile bitstreams as early as possible. Before such tile bitstreams are to be rendered, they can be received and decoded so that, when their display times arrive, they will be ready for immediate display. As mentioned herein, a first picture in a compressed tile bitstream may be compressed using intra-prediction. The timing of the first picture may not align with the display time (as predicted) of the tile stream. The first picture can be decoded independently of any other picture and may serve as a starting reference to decode subsequent pictures in the stream. As such, it can be desirable to receive and initiate the decoding of such compressed tile stream as early possible.

At 508, tiles that form a current viewing area of the wide-angle image are rendered using the receiver list. Each tile of the receiver list and the phase-out list is associated with a respective display time.

Rendering the tiles at 508 includes, at 508_2, decoding and displaying tiles of the receiver list associated with display times that are not larger than the current time t. That is, if a tile $T_{R,i}$ is with a time tag of $t_0+d$ that is not larger than the current time t, then the tile $T_{R,i}$ belongs to the current viewing area and, as such, is to be decoded (if not already decoded) and displayed. It is noted that each tile in $\{T_{R,i}, t\}$ is predicted by the viewpoint prediction function in the receiver at a certain time to that is prior to the current time t, such that ($t_0+d$) is approximately equal to the current time t. That is, the display time of these times is now due and they belong to the current viewing area. It is also noted that decoding and displaying may merely mean displaying since the tile of the tile stream that is to be currently displayed may have already been received and decoded, as described above.

Rendering the tiles at 508 also includes, at 5084, stopping decoding and displaying tiles of the phase-out list associated with the display times that are not larger than the current time t. That is, if a tile $O_{R,i}$ is with a time tag of $t_0+d$ that is no larger than t, the tile $O_{R,i}$ (i.e., the compressed tile bitstream associated therewith) is no longer to be decoded and displayed because it is no longer predicted to be in the viewport (i.e., a future viewport). As such, The tiles having display times that are not larger than the current time t are now removed from the phase-out list. Similarly, the tiles of the phase-out list having display times that are not larger than the current time t are removed from the receiver list. A tile may be removed from the phase-out list based at least in part on a determination that the tile is not predicted to be in a future viewport. A tile that is not predicted to be in the future viewport may still be included in (e.g., not removed from) the phase-out list until its display time is out of date (i.e., until its associated display time is no larger than a current time).

The updated receiver list can then be transmitted to the edge node to which the receiver is connected. To reiterate, the receiver list includes all the tiles that the receiver is still using or is going to use in the future. The updated receiver list can be transmitted to the edge node in a uFM.

Figure 6:
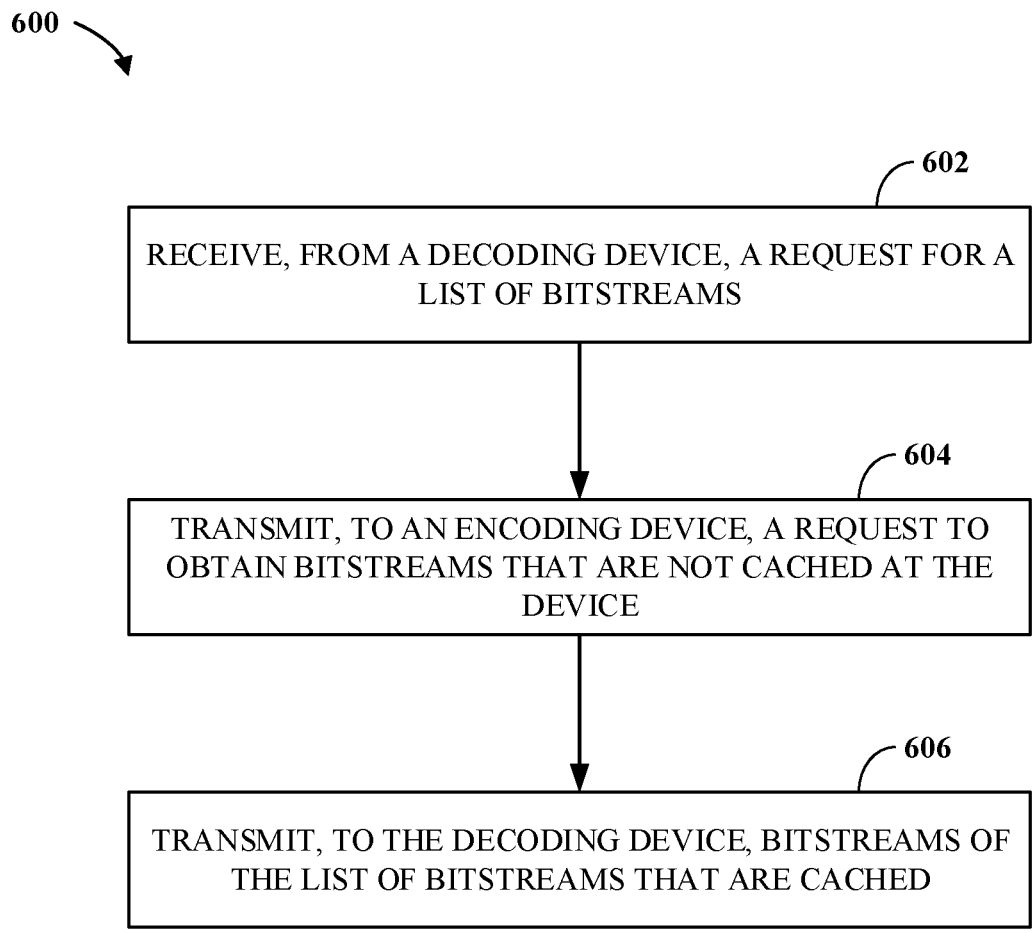
FIG. 6 is a flowchart of an example of a technique 600 of a service node for efficient real-time wide-angle video communication.

FIG. 6 is a flowchart of an example of a technique 600 of a service node for efficient real-time wide-angle video communication. The technique 600 can be implemented by a service node (e.g., an edge node) of the network 300 of FIG. 3 or the network 403 of FIG. 4. The technique 600 can be implemented as software modules stored in a memory of the network node as instructions and/or data executable by a processor of the network node. For another example, the technique 600 can be implemented in hardware as a specialized chip storing instructions executable by the specialized chip. The technique 600 can be performed by the network node at every time step.

As described with respect to FIG. 4, the service node stores, in a cache, respective compressed bitstreams corresponding to (e.g., associated with) tiles of the wide-angle video and maintains an edge list, $\{T_{E,i}, t_1\}$, of tiles corresponding to the cached bitstreams. Maintaining the edge list can mean adding and removing tile indicators from the edge list, as further described below. As also described above, the edge list includes tiles currently used and tiles (i.e., tile streams) predicted to be used by a decoding device. That is, the edge list includes tile indicators of tiles currently being viewed and tile indicators of tiles predicted to be viewed at a receiver.

At 602, the network node receives a request for a list of bitstreams. As described above, the network node can be an edge node and the request for the list of bitstreams can be received from a receiver. The request for the list of bitstreams received from the receiver can be or can include the receiver list 412. That is, the request for the list of bitstreams includes the receiver list $\{T_{R,i}, t+d\}$.

Receiving, from the decoding device, the request for the list of bitstreams can include receiving, from the decoding device, a decoder list of tiles. The network node can receive multiple decoder lists and/or edge lists, each from one of the multiple edge nodes or decoders. The edge list of tiles is updated to add tiles of the decoder list(s) that are not in the edge list(s). Tile bitstreams associated with tiles that are not included in any of the received decoder lists are removed from the cache. The edge list is also updated to remove tiles that are not in any of the decoder lists. As described herein, adding a tile or removing a tile from the edge list can mean adding or removing an indication (e.g., a descriptor) of the tile from the edge list.

The service node updates its cached bit stream list (i.e., the edge list $\{T_{E,i}, t_1\}$) based on the set of received receiver lists $\{\{T_{R,i}^k, t+d\}_k\}$, for k=0 . . . N−1, where N indicates the number of receivers that the service nodes may receive receiver lists from. The technique 600 can examine each of the tile indicators $T_{R,i}^k$ of each received receiver list $\{T_{R,i}^k, t+d\}$. If a $T_{R,i}^k$ is not already in the edge list $\{T_{E,i}, t_1\}$, then the tile indicator $T_{R,i}^k$ is added to the edge list $\{T_{E,i}, t_1\}$. Additionally, the technique 600 removes from the edge list $\{T_{E,i}, t_1\}$ all tile indicators $T_{E,i}$ that are not in any of the received receiver lists $\{\{T_{R,i}^k, t+d\}_k\}$. The updated edge list $\{T_{E,i}, t_1\}$ is then transmitted to an up stream service node and is ultimately received by the sender. The sender may receive multiple edge lists and may aggregate them into the sender list $\{T_{S,i}, t_2\}$, as described below. As further described below, the sender encodes tile streams corresponding to new tile indicators added to the edge list $\{T_{E,i}, t_1\}$) and stops encoding tile streams corresponding to tile indicators removed from the edge list $\{T_{E,i}, t_1\}$). Accordingly, at 604, a request to obtain bitstreams that are not already cached at the service node is transmitted to the sender (i.e., to an encoding device). The request can be an eFM, as described above.

At 606, bitstreams corresponding to tile indicators $T_{R,i}$ and that are already cached at the service node are then transmitted (e.g., streamed) to the decoding device from which the request for the list of bitstreams was received. That is, cached bitstreams associated with tiles (i.e., tile indicators) included in the decoder list are transmitted to the decoding device. Thus, even though some of the $T_{R,i}$ compressed tile streams are going to be needed in the future, the edge node can, as soon as available (e.g., at this time step), transmit the compressed bitstream to the receiver. Accordingly, the receiver can decode the received compressed bitstreams in advance (e.g., before their respective display times).

In some implementations, and as already described above, the edge node may maintain, for each receiving device that is connected to the edge node, a respective edge list and may perform separate operations, as described above with respect to FIG. 6 for each of the receivers. However, such processing may result in redundant requests to the sender for the same tile streams and the duplicate caching of the same tile streams. As such, in an implementation, the edge node may maintain a single edge list $\{T_{E,i}, t_1\}$ for all the receivers connected to the edge node. Alternatively, the edge node may maintain separate edge lists for the respective receivers and combine (i.e., by unioning) the respective edge lists in a combined edge list for transmission to the sender in the sFM. This combined edge list can be used to share the common streams of a single tile. As such, an existing compressed tile bitstream that has been buffered (cached) for one receiver can be shared by (e.g., transmitted to) another receiver that requests the same tile bitstream.

Figure 7:
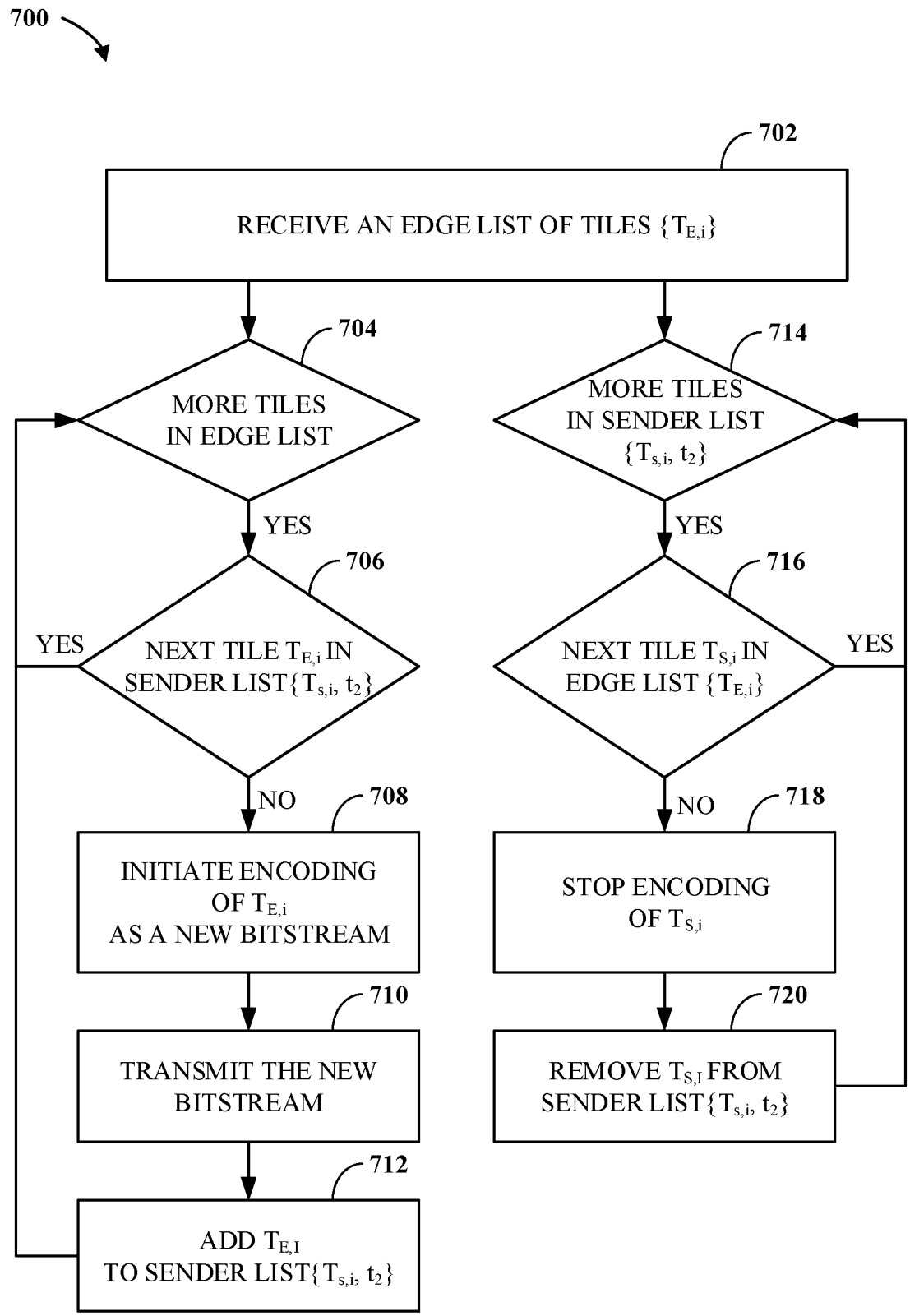
FIG. 7 is a flowchart of an example of a technique 700 of a sender for efficient real-time wide-angle video communication.

FIG. 7 is a flowchart of an example of a technique 700 of a sender for efficient real-time wide-angle video communication. The technique 700 can be implemented by a sender, such as the sender 402 of FIG. 4 or the apparatus 102 of FIG. 1. Technique 700 can be implemented as software modules stored in the memory 110 of FIG. 1 as instructions and/or data executable by the processor 108 of FIG. 1. For another example, the technique 700 can be implemented in hardware as a specialized chip storing instructions executable by the specialized chip.

As described with respect to FIG. 4, the sender can maintain a sender list $\{T_{S,i}, t_2\}$ of tiles of a wide-angle video being encoded and streamed by the encoder of the sender. The technique 700 can be performed by the sender at each time step. To illustrate, if the sender is transmitting images of the wide-angle video at a rate of 30 frames per second, then the technique 700 may be performed once approximately every 33 milliseconds.

At 702, the sender receives an edge list of tiles $\{T_{E,i}\}$. The edge list of tiles can be received from a service node in a sFM, as described above. The edge list of tiles $\{T_{E,i}\}$ constitutes a request to encode a stream corresponding to each of the tiles indicated in the edge list of tiles $\{T_{E,i}\}$. As described above, encoding a stream corresponding to a tile, as used herein, can mean encoding the tile in an enhancement layer of a bitstream. The sender can use the edge list of tiles $\{T_{E,i}\}$ to identify tile streams to start encoding and tile streams to stop encoding.

In some implementations, the encoder may maintain a respective sender list for each of the service nodes (e.g., edge nodes) that the sender receives edge lists from (i.e., requests for tile streams). However, such processing may result in repeated encoding and transmission of compressed streams. As such, in some implementations, the sender combines (e.g., unions) into one single edge list $\{T_{E,i}\}$ all edge lists $\{\{T_{E,i}^k\}_k\}$ received from service nodes (e.g., edge nodes), for k=0 . . . M−1, where M indicates the number of service node that the sender may receive edge lists from. Combining the received edge lists avoiding the repeated encoding of tile streams. Additionally, an existing stream that has been initiated for one receiver can be shared by another receiver that requests the same stream.

At 704, the technique 700 iterates over the edge list of tiles $\{T_{E,i}\}$ and performs the steps 706-712 for each of the tile's $T_{E,i}$. At 706, the technique 700 determines whether a tile $T_{E,i}$ is in the sender list $\{T_{S,i}, t_2\}$. If the sender list $\{T_{S,i}, t_2\}$ includes $T_{E,i}$, then the encoder is already encoding a stream corresponding to the tile $T_{E,i}$ and, as such, the sender continues such encoding and the technique 700 proceeds back to 704. On the other hand, if the sender list $\{T_{S,i}, t_2\}$ does not include $T_{E,i}$, then, at 708, the encoder initiates the encoding of the tile $T_{E,i}$ as a new bitstream and, at 710, the sender transmits the new tile bitstream to the receiver via the network 403. The encoder may start the encoding of a tile bitstream using intra prediction or an Instantaneous Decoding Refresh (IDR) image. As such, the new bitstreams are received by service nodes before reaching the intended receivers. The service nodes can cache such new received bitstreams. Edge lists need not be updated at the service nodes since the edge lists already include these new received bitstreams: the new bitstreams are generated (e.g., encoded) in response to requests from a decoder or a network node. At 712, the sender updates its sender list $\{T_{S,i}, t_2\}$ to include the tiles for which encoding was initiated at 708 and proceeds back to 704.

At 714, the technique 700 iterates over the sender list of tiles $\{T_{S,i}, t_2\}$ and performs the steps 716-720 for each of the tile's $T_{S,i}$. At 716, the technique 700 determines whether a tile $T_{S,i}$ is in the edge list $\{T_{E,i}\}$. If the edge list $\{T_{E,i}\}$ includes the tile $T_{S,i}$, the encoder continues encoding the tile $T_{S,i}$ and the technique 700 proceeds back to 714. The encoder continues to encode the tile $T_{S,i}$ according to any encoding structure that the encoder may choose. As a person skilled in the art recognizes, many different coding structures are possible. Using the nomenclature of H.264 or HEVC, an encoding structure may include intra-coded (I) images/tiles, predicted (P) images/tiles, or bi-directional predicted (B) images/tiles. For example, a tile stream may be encoded using the structure IPPPPP* (where the * indicates repetition), or the repeating structure IPBP, or some other structure. The encoder may also periodically include an intra-predicted (I) tile or an IDR.

If the edge list $\{T_{E,i}\}$ does not include the tile $T_{S,i}$, then the receiver is no longer viewing the stream of the tile $T_{S,i}$, and the technique 700 proceeds to 718. At 718, the encoder stops encoding a bitstream corresponding to the tile $T_{S,i}$. At 720, the tile $T_{S,i}$ is removed from the sender list $\{T_{S,i}, t_2\}$ and the technique 700 proceeds back to 714.

While the technique 700 shows that the paths 704-712 and 714-720 may be performed in parallel, that need not be the case. In an implementation, the path 704-712 may be performed before the path 714-720, or vise versa. Other arrangements of the steps of the technique 700 are also possible.

As already mentioned, the buffered streams at a service (e.g., edge) nodes should include the coded bits starting from an I-picture or IDR-picture. To avoid the storing of long bitstreams at the service nodes, the sender (i.e., the encoder therein) may be configured to use coding structures so as to periodically use an I-picture or IDR-picture.

As described above, a person skilled in the art will note that all or a portion of aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

The implementations of computing devices (i.e., apparatuses) as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing, either singly or in combination.

The aspects herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

The terms "signal" and "data" are used interchangeably herein. Further, portions of the computing devices do not necessarily have to be implemented in the same manner. Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method of decoding a compressed wide-angle video including a wide-angle image, comprising:
   maintaining, at a receiving device of the compressed wide-angle video, a phase-out list that includes tiles of a current viewport of the wide-angle image that are currently being displayed in the viewport but predicted to no longer be in the viewport after a time duration d from a current time t, wherein the compressed wide-angle device is received from a sending device via a network;
   obtaining, by the receiving device, predicted tiles of the wide-angle image, wherein the predicted tiles are predicted to be viewed at a time that is later than the current time t;
   updating, by the receiving device, a receiver list by adding to a receiver list those of the predicted tiles that are not in the receiver list; and
   rendering, by the receiving device, tiles that form a current viewing area of the wide-angle image using the receiver list, wherein each tile of the receiver list and the phase-out list is associated with a respective display time, and wherein rendering the tiles comprises:
   decoding and displaying tiles of the receiver list associated with display times that are not larger than the current time t;
   stopping decoding and displaying tiles of the phase-out list associated with the display times that are not larger than the current time t; and
   removing from the receiver list the tiles of the phase-out list having display times that are not larger than the current time t,
   wherein the method further comprises transmitting the receiver list to an edge node of a network.

2. The method of claim 1, further comprising:
   receiving compressed tile bitstreams associated with at least some of the tiles of the receiver list.

3. The method of claim 2, wherein respective first pictures of the compressed tile bitstreams are encoded using intra-prediction.

4. The method of claim 3, wherein rendering the tiles further comprises:
   decoding, b the receiving device, without displaying at least some of the compressed tile bitstreams associated with tiles having display times that are larger than the current time t.

5. The method of claim 1, wherein rendering the tiles further comprises: removing, from the phase-out list, tiles having display times that are not larger than the current time t.

6. The method of claim 1, wherein rendering the tiles further comprises: removing a tile from the phase-out list based at least in part on a determination that the tile is not predicted to be in a future viewport.

7. A device for real-time wide-angle video communication in the network comprising the device, the sending device and the receiving device, the device comprising:
   a processor configured to:
   receive, by the device from the sending device via the network, a request for a list of bitstreams, wherein each bitstream is associated with a respective encoding of a tile of an image of the compressed wide-angle video;
   transmit, by the device to the receiving device via the network, a request to obtain first bitstreams of the list of bitstreams, wherein die first bitstreams are not cached at the device; and
   transmit, to the receiving device, second bitstreams of the list of bitstreams, wherein the second bitstreams are cached at the device, and the receiving device is configured to perform the method of claim 1.

8. The device of claim 7, wherein the processor is further configured to:
   store, in a cache, respective bitstreams associated with tiles of the compressed wide-angle video; and
   maintain an edge list of tiles corresponding to bitstreams that are cached.

9. The device of claim 8, wherein the edge list of tiles includes tiles currently used and tiles predicted to be used by the receiving device.

10. The device of claim 8, wherein to receive, by the device from the receiving device via the network, the request for the list of bitstreams comprises to:
 receive a decoder list of tiles from the receiving device; and
 update the edge list of tiles to add tiles of the decoder list that are not in the edge list;
 remove, from the cache, bitstreams associated with tiles that are not included in the decoder list; and
 update the edge list to remove tiles that are not in the decoder list.

11. The device of claim 10, wherein to transmit, by the device to the decoding device via the network, the second bitstreams of the list of bitstreams comprises:
 transmit, to the receiving device, cached bitstreams associated with tiles included in the decoder list.

12. The device of claim 11, wherein to transmit, by the device to the sending device via the network, the request to obtain the first bitstream is comprises to:
 transmit, to the sending device, the edge list of tiles.

13. The device of claim 12, wherein the edge list of tiles comprises respective tiles from more than one receiver.

14. A encoding device for encoding a wide-angle video for real-time wide-angle video communication in a network comprising the device, an edge device, and a receiving device, comprising:
 a processor configured to:
 receive, from the edge device via the network, an edge list of tiles associated with the wide-angle video to be encoded and transmitted to the receiving device via the network;
 responsive to a determination that a first tile is included in the edge list received from the edge device but not in a sender list maintained by the encoding device:
 initiate encoding of the first tile as a new bitstream; and
 transmit the new bitstream to the edge device; and
 responsive to a determination that a second tile is included in the sender list but not the edge list:
 stop encoding a bitstream corresponding to the second tile; and
 remove the second tile from the sender list,
 wherein the processor is further configured to:
 receive respective edge lists from edge devices;
 update the sender list using the respective edge lists; and
 responsive to a determination that the edge list includes the second tile and that a compressed bitstream associated with the second tile is being transmitted to another edge device, transmit the compressed bitstream to the edge device.

15. The encoding device of claim 14, wherein to transmit the new bitstream to the edge device comprises to:
 transmit, to the edge device, respective bitstreams associated with the tiles of the sender list.

16. The encoding device of claim 14, wherein respective time tags are associated with the tiles of the edge list.

\* \* \* \* \*